United States Patent [19]
Reinhardt et al.

[11] Patent Number: 5,909,696
[45] Date of Patent: *Jun. 1, 1999

[54] METHOD AND APPARATUS FOR CACHING SYSTEM MANAGEMENT MODE INFORMATION WITH OTHER INFORMATION

[75] Inventors: Dennis Reinhardt, Palo Alto; James P. Kardach, Saratoga; John W. Horigan, Mountain View; Neil Songer, Santa Clara, all of Calif.; Andrew F. Glew, Hillsboro, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/656,922

[22] Filed: Jun. 4, 1996

[51] Int. Cl.⁶ ..................................................... G06F 13/14
[52] U.S. Cl. .......................... 711/144; 711/141; 711/142; 711/149; 711/150; 711/155; 711/168; 711/144
[58] Field of Search ...................................... 395/403, 490, 395/471, 869, 479, 183.1, 734, 481, 700, 733; 711/141, 149, 150, 154, 155, 168, 144

[56] References Cited

U.S. PATENT DOCUMENTS

| | | | |
|---|---|---|---|
| 5,339,437 | 8/1994 | Yuen | 395/700 |
| 5,475,829 | 12/1995 | Thome | 395/479 |
| 5,509,139 | 4/1996 | Ayash et al. | 395/869 |
| 5,544,344 | 8/1996 | Frame | 711/144 |

*Primary Examiner*—Eddie P. Chan
*Assistant Examiner*—T. V. Nguyen
*Attorney, Agent, or Firm*—Alex U. Witkowski

[57] ABSTRACT

A novel method and apparatus to cache System Management Mode (SMM) data with other data to improve performance and reduce latency of SMM handler routines. This method and apparatus allows SMM data and non-SMM data to be distinguished in the cache without requiring extra cache bits which can add to the cost of implementation. Since SMM data and non-SMM data can coexist in the cache, there is no need for time consuming cache flush cycles when switching between the two modes. Since SMM data can be cached, performance of SMM routines are improved. This method and apparatus defines the SMRAM address range to be a range of addresses representable by the tag, but not directly corresponding to installed main memory. When accesses are made to SMRAM addresses, they are redirected to an unused portion of main memory. Protection mechanisms may be implemented to limit access to these SMRAM addresses when not in SMM.

65 Claims, 6 Drawing Sheets

METHOD AND APPARATUS FOR CACHING SYSTEM MANAGEMENT MODE INFORMATION WITH OTHER INFORMATION

BACKGROUND OF THE INVENTION

1. Field of the Invention

The present invention relates to computer systems; more particularly, the present invention relates to computer systems operable in system management mode.

2. Description of Related Art

System management mode (SMM) allows systems developers to provide low level functions, such as power management or security, in a manner that is transparent to operating systems and application programs. SMM allows operating system and application software operation to be interrupted to perform these low level functions. After performing the low level function, the operating system or application software operation is resumed from the point that it was interrupted.

In order to initiate a low level function, a hardware interrupt, referred to herein as the System Management Interrupt (SMI), is generated. When an SMI is received, the processor waits for all pending writes to complete. The processor also waits for writes pending on external devices, such as external caches. Once all pending writes are completed, the processor then saves some of its register state to System Management Random Access Memory (SMRAM) and begins execution of an SMM handler, a software routine that performs low level functions, such as error reporting and logging, I/O emulation, suspend or resume operation, and power management.

SMRAM is memory that is reserved for SMM. The SMM handler is stored in SMRAM. Before execution of the SMM handler, the processor automatically stores some of its register state in a reserved portion of SMRAM. For example, the processor often stores the state of its segmentation registers, general purpose registers, instruction pointer, descriptor table registers, and model specific registers in the reserved portion of the SMRAM. Some register state, such as the floating point registers, may not be automatically stored upon entry to SMM since many SMM handlers do not modify these registers. However, if these registers are used in an SMM handler, code to store and restore these registers may be included in the SMM handler routine.

The SMM handler routine operates in a mode similar to Real mode. One difference between SMM and Real mode is that the 32-bit processor can address 4 gigabytes of address space in SMM. Real mode (and protected mode) are well-known to those familiar with Intel Architecture processors and those skilled in the art.

A RSM (Resume) instruction at the end of the SMM handler routine returns control to any interrupted program. During execution of the RSM instruction, the processor restores its state from the SMRAM and resumes execution of the interrupted routine. Since the internal state of the processor is restored and all memory accesses are to the SMRAM, this interrupt is transparent to both operating system and application software.

In the prior art, SMRAM is in a different memory space than the standard (non-SMM) memory space for SMM to be transparent to the operating system. The standard memory space typically addresses all of main memory. Rather than have a separate memory for the SMRAM, the SMRAM is typically stored in an unused portion of main memory, such as the graphics adapter memory. In some processors, the location of SMRAM is mapped to an address range within the SMRAM address space that corresponds to an unused portion of main memory. In some Intel Architecture processors, the initial SMRAM location is 00030000H (The "H" appended onto the end of the address indicates that the address is represented in hexadecimal). In the prior art, the graphics adapter memory address range corresponds to addresses A0000H to BFFFFH. Therefore, SMRAM addresses from 30000H to 4FFFFH are mapped to A0000H to BFFFFH. When accesses to addresses in the graphics adapter memory address range are made while in SMM, the request is directed through the memory controller to the main memory (SMM data). When accesses to addresses in the graphics adapter memory address range are made while not in SMM, the request is directed through a peripheral input/output (I/O) bridge to the graphics adapter memory on a video device (non-SMM data). Although data stored in SMRAM may have the same address as data stored in the standard address space, SMM data and non-SMM data corresponding to that address are distinct. Since cache memory distinguishes data elements by their address alone, there is no mechanism for distinguishing between the SMM data at a particular address and the non-SMM data at that same address even though both have distinct data.

If SMM data and non-SMM data were stored in the cache with no mechanism to distinguish them, data corruption problems may occur. When data at a particular address is written back from the cache, the memory subsystem cannot determine whether that data is SMM data or non-SMM data. For example, if the writeback data was SMM data, the memory subsystem should route it to the main memory. If the writeback data was non-SMM data, the memory subsystem should route it to a peripheral I/O device, for example. If the external system routes the writeback data incorrectly, the SMM data may be overwritten by non-SMM data or vice-versa, thereby corrupting the data at that address.

One prior art method to keep SMM data and non-SMM data distinct in the cache is to make SMM data and non-SMM data sharing the same address to be non-cacheable. The graphics adapter memory address range is an excellent candidate for such non-cacheable non-SMM memory. The graphics adapter memory is normally uncached because pixel data to be written to the display should be updated to the graphics adapter memory rather than be stored indefinitely in a writeback cache. In this method, the SMRAM sharing the same address range is also uncached. In this method, a cache flush is not required when switching between SMM and non-SMM, since SMM data is not stored in the cache. A disadvantage of this method is that non-cacheable bus cycles are slower than cacheable bus cycles. Although the latency is improved because flush operations are not necessary, the throughput of instructions and data is reduced because of the slower access times of non-cacheable cycles.

Another prior art method to keep SMM data and non-SMM data distinct has been to flush the cache when entering and leaving SMM. While in non-SMM, the processor generally performs cacheable bus cycles. When an SMI is recognized, a cache flush is performed prior to entering SMM to purge the cache of all non-SMM data so that SMM data may be cached. While in SMM, the processor generally performs cacheable bus cycles. When an RSM has been received, a cache flush is performed prior to leaving SMM to purge the cache of all SMM data so that non-SMM data may be cached. In SMM, the cache only contains SMM data.

In non-SMM, the cache only contains non-SMM data. The advantage of this method is that SMM and non-SMM bus cycles can be cached, resulting in faster access times. However, the cache flushes required to enter and exit SMM take a long time, leading to increased latency of the system management handler. This may be a problem for SMM handlers that are required to respond quickly and for interrupt handlers that cannot afford to be disabled through two lengthy cache flushes. For example, a real-time operating system requires a low latency in order to respond to events in real-time. In addition, real-time applications such as audio playback, speech recognition, modem emulation including digital simultaneous voice and data (DVSD) and video conferencing, for example, require low latency as well. The consequences of increased latency may be "tears" and "frame drop outs" in video applications and shortened sounds and other aural artifacts in audio applications. En addition, increased latency may also cause data corruption, system crashes, and loss of critical services.

What is needed is a method to allow SMM data and non-SMM data to be stored in the cache without data corruption problems while avoiding cache flush operations when switching between SMM and non-SMM. Furthermore, what is needed is a method to reduce latency and increase performance of SMM handler routines.

SUMMARY OF THE INVENTION

A method and apparatus for translating system management random-access-memory (SMRAM) addresses to a corresponding main memory address such that SMM data and non-SMM data can co-exist in the cache without data corruption problems is described. The SMRAM address range is outside of the main memory address range so that SMRAM can be distinguished from all main memory addresses in the cache. The SMRAM address is translated to a corresponding main memory address so that SMRAM is located in an otherwise unused portion of main memory.

DETAILED DESCRIPTION

In the following description, numerous specific details are set forth such as specific memory configurations, address ranges, protection schemes, etc., in order to provide a more thorough understanding of the present invention. It will be apparent, however, to one skilled in the art, that the present invention may be practiced without these specific details. In other instances, well known apparatus and process steps have not been described in detail in order to avoid obscuring the invention.

System Management Mode

The present invention allows System Management Mode (SMM) data and code to be stored in a cache with non-SMM data. In the present invention, this is made possible by having one or more system management random-access-memory (SMRAM) address ranges outside of the main memory address range so that SMRAM addresses can be distinguished from all main memory addresses when stored in the cache. When SMRAM data is stored in the main memory or retrieved from the main memory, the SMRAM address is translated to a corresponding alias SMRAM addresses in one or more unused portions of main memory. For example, when the SMRAM data is written-back from the cache, logic translates the SMRAM address used to distinguish it from main memory addresses to a corresponding alias SMRAM address that corresponds to a portion of main memory to be used as SMRAM. The distinct address ranges allow SMM data from SMRAM to be concurrently stored in the cache with non-SMM data thereby reducing access times and latency of SMM handler routines.

Computer System

Figure 1:
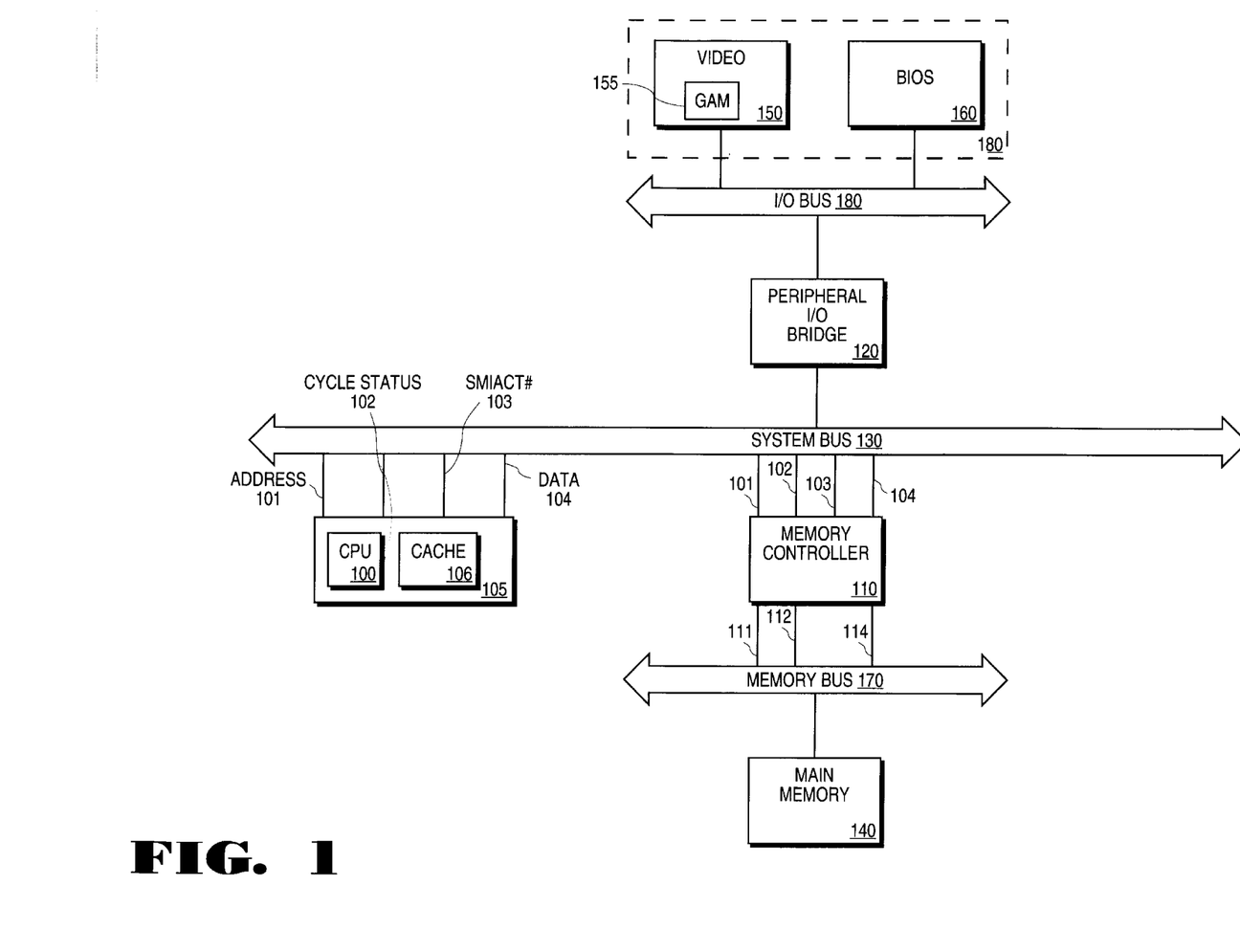
FIG. 1 illustrates one embodiment of a computer system of the invention.

FIG. 1 illustrates one embodiment of a computer system using the invention. The computer system comprises a processor (CPU) 100 and a cache 106 coupled in a processor subsystem 105. The processor subsystem 105 is coupled to a system bus 130. Bus cycle requests are driven onto the system bus 130 by the processor subsystem 105 and other busmasters, for example, according to well-known methods. A memory controller 110 and a peripheral I/O bridge 120 are also coupled to the system bus 130. If a bus cycle request on the system bus 130 has an address within specified memory address ranges, the memory controller 110 redirects them through a main memory bus 170 to a main memory 140. In the present invention, one such memory address range is the SMRAM address range. If a bus cycle request on the system bus 130 has an address within specified peripheral I/O address ranges, the peripheral I/O bridge 120 directs them through a peripheral I/O bus 180 to peripheral I/O devices 190, such as a video device 150 or a Basic Input/Output System (BIOS) 160. One peripheral I/O address range is the video graphics adapter memory address range that corresponds to a graphics adapter memory (GAM) 155 on the video device 150. In one embodiment, the peripheral I/O bus 180 and the main memory bus 170 are implemented as a single bus and a control signal is used to indicate whether the cycle should be processed by peripheral I/O devices 190 or the main memory 140, for example, according to well-known methods.

The memory controller 110 is coupled to the system bus 130 which includes an address bus 101, a cycle status bus 102, an SMIACT# bus 103, and a data bus 104. The SMIACT# bus 103 indicates whether the processor subsystem 105 is in SMM mode. (The "#" suffix indicates that the signal is low when the condition is true) The cycle status bus 102 indicates whether the system bus 130 is active and, if active, what type of cycle is being performed. The address bus 101 indicates the address of the bus request. When the bus request is a write cycle, the processor subsystem 105 writes the data associated with that address onto the data bus 104. When the bus request is a read cycle, the processor subsystem 105 reads the data from the data bus 104 when it is returned. If the memory controller 110 determines that the bus request should be processed by it (rather than, for example, the peripheral I/O bridge 120), it generates a bus request on the main memory bus 170 that corresponds to the bus request on the system bus 130. The main memory bus 170 includes an address bus 111, a cycle status bus 112, and a data bus 114. The memory controller 110 comprises SMRAM address match logic that determines whether the address on the address bus 101 is within the SMRAM address range and SMRAM cycle match logic that determines whether the cycle is one which is permitted to access SMRAM. The memory controller 110 also comprises an address translation logic 410 that translates (maps) the SMRAM address to a corresponding alias SMRAM address which is driven onto the address bus 111 if the cycle is a permitted cycle having an address within an SMRAM range, and, if the cycle is not, the address on the address bus 101 is driven onto the address bus 111. The cycle status bus 112 indicates whether the main memory bus 170 is active and, if active, what type of cycle is being performed. When the cycle type is a write cycle, the data bus 114 contains data that corresponds to the data written by the processor subsystem 105 onto the data bus 104. When the cycle type is a read cycle, the data bus 114 subsequently contains data retrieved from the main memory 140 which is subsequently returned onto the data bus 104. In one embodiment, the memory controller 110 also comprises hard error logic that indicates an error when certain impermissible bus cycles having addresses within an SMRAM address range are detected.

Selecting SMRAM Address Ranges

Two factors to consider in selecting an SMRAM address range are the address range used by the main memory and the address space representable on the address bus. In the present invention, each SMRAM address range is defined to be within a portion of the address range representable on the address bus which is outside of the main memory address range. The main memory address range includes all addresses that directly correspond (without translation) to installed main memory. The main memory address range is a subset of all addresses that can be represented on the address bus. For example, a 32-bit address bus is able to address 4 gigabytes (4 GB) of main memory using addresses from 00000000H to FFFFFFFFH (The "H" appended onto the end of the address indicates that the address is represented in hexadecimal), but there may be only 64 MB, for example, of installed main memory. In such a computer, the main memory address range is 00000000H to 03FFFFFFH and the SMRAM address range can be defined in a portion of the address range from 04000000 to FFFFFFFFH. Since the cache uses the most significant bits of the address as the tag element (described below) to distinguish data elements in the cache, SMM data and non-SMM data can be distinguished in the cache. When SMM data is written back from the cache, the address translation logic translates the SMRAM address to a corresponding alias SMRAM address within an unused portion of the main memory. In one embodiment, SMRAM address ranges in the higher portion of the available address space are preferred in order to reduce the likelihood that applications will access the SMRAM address range rather than the main memory address range.

A third factor to consider in selecting an SMRAM address range is the address range representable by the tag elements in the cache. A tag element consist of the most significant bits of the address of the associated data element stored in the cache. The tag element is used to identify the address of the data element. In one embodiment, the tag elements in the cache do not store some of the most significant bits of the addresses. In such an embodiment, each SMRAM address range must be selected such that the unstored address bits are not required to distinguish it from the main memory address range. For example, the main memory address range corresponds to 00000000H to 03FFFFFFH when 64 MB of main memory is installed. In such a system, the 6 most significant bits of the address are always zero when directly accessing the main memory. Some chip area can be saved by not storing the highest order bits in the tag elements of the cache under the assumption that they will not be used even after allowing for future memory upgrades. For example, if the three most significant bits of the address, A31, A30, and A29, were not stored in the cache, the cache would still be able to distinguish all addresses below 512 MB (1FFFFFFFH) from each other. However, if addresses above 1FFFFFFFH were stored in the cache of such a system, data corruption problems may occur. For example, address 3FF00000H would be stored in such a cache tag array as 1FF00000H. When the data associated with 3FF00000H were written back to main memory, for example, it would be stored at 1FF00000H thereby corrupting the data previously stored at 1FF00000H. In order to support addresses above 1FFFFFFFH without data corruption, a default caching type of "uncached" is assigned to all addresses outside the cache tag address range. Therefore, although each SMRAM address range is defined to be outside the main memory address range, it should still be within the range of address space that is implemented in the tag elements in order to obtain the performance benefits of caching SMM data.

A fourth factor to consider in selecting an SMRAM address range is the indeterminacy of the A20M# pin during SMM. The A20M# pin is well-known to those familiar with the Intel architecture microprocessors. In one embodiment, the A20M# pin is indeterminate during SMM. In one embodiment, the A20 bit is not tested in determining whether the address is in an SMRAM address range in order to make the logic independent of the indeterminate A20M# signal. Therefore, addresses of 1FFXXXXXH, for example, will also be a match for address range 1FEXXXXXH. This is done by having the SMRAM address range lie on an even megabyte address boundaries. Expressed arithmetically, the SMRAM address range is at a boundary formed by taking the logical AND of any address and FFEFFFFFH. The practical effect is that A20M# is ignored. In another embodiment, the A20 bit is matched even though the A20M# signal is indeterminate by relying on software to assign the SMRAM address range to an even megabyte range (A20 is zero). In such an embodiment, the corresponding odd megabyte (A20 is one) can be assigned to other functions.

Selecting Alias SMRAM Address Ranges

One consideration in selecting an alias SMRAM address range is the location of unused portions of memory. In the present invention, each alias SMRAM address range is defined to be an address range that corresponds to an unused portion of the main memory. In one embodiment, one alias SMRAM address range corresponds to the graphics adapter memory address range. In one embodiment, the graphics adapter memory address range corresponds to the address range A0000H to BFFFFH. Referring to FIG. 1, since all addresses within the graphics adapter memory address range on the system bus 130 are redirected by the peripheral I/O bridge 120 to the graphics adapter memory 155 on the video device 150, main memory data elements corresponding to these addresses are not used by the video device 150. In the present invention, an SMRAM address on the system bus 130 is redirected by the memory controller 110 to the main memory bus 170 using a corresponding alias SMRAM address within the portion of main memory left unused by video device. In one embodiment, one alias SMRAM address range corresponds to the graphics adapter memory and Industry Standard Architecture (ISA) expansion address ranges. The ISA expansion region corresponds to the address range C0000H to DFFFFH. The ISA expansion region is divided into eight 16K blocks that can be independently allocated to memory or devices. When a block is allocated to a device, like the graphics adapter memory, it is available for use in the alias SMRAM address range. When a block is allocated to memory, it is unavailable for use in the alias SMRAM address range. In one embodiment, the programmer is responsible to place SMM code in portions of the SMRAM range that do not include segments allocated to peripheral I/O devices, for example. In still another embodiment, an alias SMRAM range corresponds to a portion of main memory which is reserved for SMRAM. In one embodiment, an alias SMRAM range corresponds to a block of the last (highest) 128K addresses of the main memory address range. In one embodiment, an alias SMRAM range corresponds to a block of the last 256K addresses of main memory address range. It will be apparent to one skilled in the art that alias SMRAM address ranges in other portions of the main memory address range and SMRAM address ranges of different sizes may be implemented.

Another consideration in selecting the alias SMRAM address range is that the path from the low order address pins of the processor to the address pins on the main memory limit the fastest operating timing (also known as a speed path). By choosing the SMRAM address and corresponding alias SMRAM address to have the exact same low-order address bits, one can avoid adding extra circuitry in the speed path. It will be apparent to one skilled in the art that the design of the decoder circuitry for the high order bits that are decoded should be done such that a new speed path will not be created.

SMRAM A–F Address Range

In one embodiment, an SMRAM A–F address range corresponds to an alias SMRAM A–F address range in an unused portion of the main memory address range, such as the graphics adapter memory. In one embodiment, the highest order address bit that is implemented in the cache tag array is used to distinguish each of the SMRAM address ranges from the main memory address range, which includes the alias SMRAM address range. In one embodiment, the SMRAM A–F address range is 1000XXXXXH and the alias SMRAM A–F range is 000XXXXXH, where each X represents any independent four bit combination. In other embodiments, other combinations of high order address bits may be used to distinguish the SMRAM address range from the main memory address range, which includes the alias SMRAM address range. In one embodiment, the SMRAM address range 1FEA0000H to 1FEDFFFFH is mapped to the alias SMRAM address range 000A0000H to 000DFFFFH. In that embodiment, all mapped addresses have an alias within the graphics adapter memory or the ISA region. In still other embodiments, only a portion of the recognized SMRAM address range translates to a target portion of the alias SMRAM address range. For example, in one embodiment, the SMRAM address range 1FEXXXXXH is mapped to the alias SMRAM address range 000XXXXXH. In this case, address 1FE00000H, for example, is mapped to 00000000H, which is not within the target portion of the alias SMRAM address range within graphics adapter memory or the ISA region and may correspond to a portion of main memory that is used for another purpose. In that embodiment, the SMM handler must only use the portion of the SMRAM address range that corresponds to the target portion of the alias SMRAM address range. In one embodiment, portions of the ISA expansion region are allocated to main memory. In that embodiment, those portions of the ISA expansion region are excluded from the target portion of the alias SMRAM address range.

SMRAM Top Segment (TSEG) Address Range

In one embodiment, an SMRAM top segment (TSEG) address range corresponds to an alias SMRAM TSEG address range in a reserved portion of the main memory address range. For example, in a computer system with 64 MB of installed main memory, the main memory address range is 00000000H to 03FFFFFFH as described above. In one embodiment, the SMRAM TSEG address range is 13FCXXXXH to 13FFXXXXH and the alias SMRAM TSEG address range is 03FCXXXXH to 03FFXXXXH (corresponding to the last 256K addresses in the main memory address range). In another embodiment, the SMRAM TSEG address range is 13FFXXXXH to 13FFXXXXH and the alias SMRAM TSEG address range is 03FEXXXXH to 03FFXXXXH (corresponding to the last 128K addresses in the main memory address range). More or less addresses may be included in the alias SMRAM TSEG address range. In addition, the alias SMRAM TSEG address range may correspond to other portions of the main memory address range. It will be apparent to one skilled in the art that other bits may be used to distinguish an SMRAM address range from its corresponding alias SMRAM address range. It will also be apparent to one skilled in the art that other address ranges may be used.

Other Embodiments of SMRAM Address Ranges

It will be apparent that one or more of TSEG address ranges and one or more A–F address ranges may be used. In another embodiment, only one or more TSEG address ranges or one or more A–F address ranges are used. It will be apparent to one of ordinary skill in the art that addresses may be mapped to arbitrary address ranges as shown above or by other methods. Note that such addresses are given fixed values. It will also be apparent to one of ordinary skill in the art that such arbitrary address ranges can be modified under program control. In one embodiment, an optional select range bus is coupled to the SMRAM TSEG address match logic and/or the SMRM A–F address match logic to allow a portion of the bits in the specified SMRAM address range to be defined externally. In one embodiment, SMRAM addresses are in the address range 1SEXXXXXH, where S represents four target bits that can be externally selected to relocate the SMRAM address range. Each target bit determines what the corresponding address bit must be to constitute a match. In another embodiment, the SMRAM address range is parameterized such that it can be easily relocated at some future time. For example, if main memory is expanded to 2 GB (3FFFFFFFH), the SMRAM address range might be relocated to 7FEXXXXXH. Caches used in such systems have more tag bits to represent the larger SMRAM addresses. It will be apparent to one of ordinary skill in the art, that other memory ranges may be selected for other system configurations.

Reserving SMRAM Address Ranges

Once appropriate SMRAM address ranges are selected, they must be reserved so that they are not used for other purposes. Referring to FIG. 1, the operating system and the BIOS 160 often indicate to the peripheral I/O Bridge 120 which addresses will be mapped to the peripheral I/O devices 190. The operating system must not select addresses within an SMRAM address range for the peripheral I/O devices 190. For example, if the operating system assigned an address within the SMRAM address range to a peripheral I/O device, both the peripheral I/O bridge 120 and the memory controller 110 would be configured to direct bus cycles at that address to their respective busses. If the peripheral I/O bridge 120 has priority over the memory controller 110, all accesses to that address would be directed to a peripheral I/O device, thereby disabling access to the SMM handler. If the memory controller 110 has priority over the peripheral I/O bridge 120, all accesses to that address would be directed to SMRAM, thereby disabling access to the Peripheral I/O device. In one embodiment, the SMRAM address range is reserved by adding a 32-bit Fixed Location Memory Range Descriptor to the System Device Configuration List in a Plug and Play BIOS. Another embodiment is for the well-known BIOS NT15/E801 service to report the top of installed memory as extending below the actual top of installed memory such that the operating system will not use the portion of installed memory between the reported top of main memory and the actual top of main memory. The unreported memory is used for SMRAM. In other embodiments, other methods of reserving the SMRAM address range may be used.

SMRAM Protection Modes

When the processor is not in SMM, limitations on the access to SMRAM may be desired to prevent unauthorized modification of critical SMM handler routines. Since the SMM handler routines run at real mode privilege levels when they are evoked in SMM, they have the potential to provide unauthorized access to privileged data and instructions. Such unauthorized access may compromise critical system control, such as thermal control, error recovery, and emulation, and may compromise protection against viruses, for example. In one embodiment, the operating system is entrusted with preventing unauthorized access to addresses in the SMRAM address range. Since access to high memory is available only to privileged programs, such as the operating system and those applications granted access by the operating system, applications cannot gain access to the SMRAM address range without provision by the operating system. Therefore, all SMRAM bus requests on the system bus 130 are assumed to be authorized by the operating system and therefore are directed to the main memory bus 170.

In another embodiment, the memory controller 110 (referring to FIG. 1) comprises protection logic to prevent certain SMRAM bus requests on the system bus 130 from being directed to the main memory bus 170. In one embodiment, the protection logic generates a hard-error signal on an optional hard-error bus when a non-writeback cycle is issued to SMRAM in non-SMM. In one embodiment, this hard-error signal is coupled to the processor subsystem 105 in order to initiate an error handler. In one embodiment, the memory controller 110 permits writeback cycles to SMRAM in non-SMM to allow updates of cached SMM data. In another embodiment, the memory controller 110 ignores writeback cycles to SMRAM in non-SMM under the assumption that only non-critical SMM data was left in the cache at the conclusion of the SMM handler routine. When the memory controller 110 ignores writeback cycles to SMRAM while not in SMM, it is important to guarantee that critical data is written-back from the cache to SMRAM before the processor returns to non-SMM. One embodiment allocates the entire SMRAM range as write-through. When a write-through data in a cache is modified, a bus cycle to update main memory is initiated. Write-through cycles reduce performance since a bus cycle must occur every time the data is modified. In another embodiment, the region of SMRAM that contains critical data is allocated as write-through and the region that contains non-critical data is allocated as writeback. This permits the performance advantages of writeback caching to be used when possible while forcing critical data to be updated to SMRAM immediately. It will be apparent to one skilled in the art that other protections schemes may be implemented.

SMRAM Logic

Figure 2:
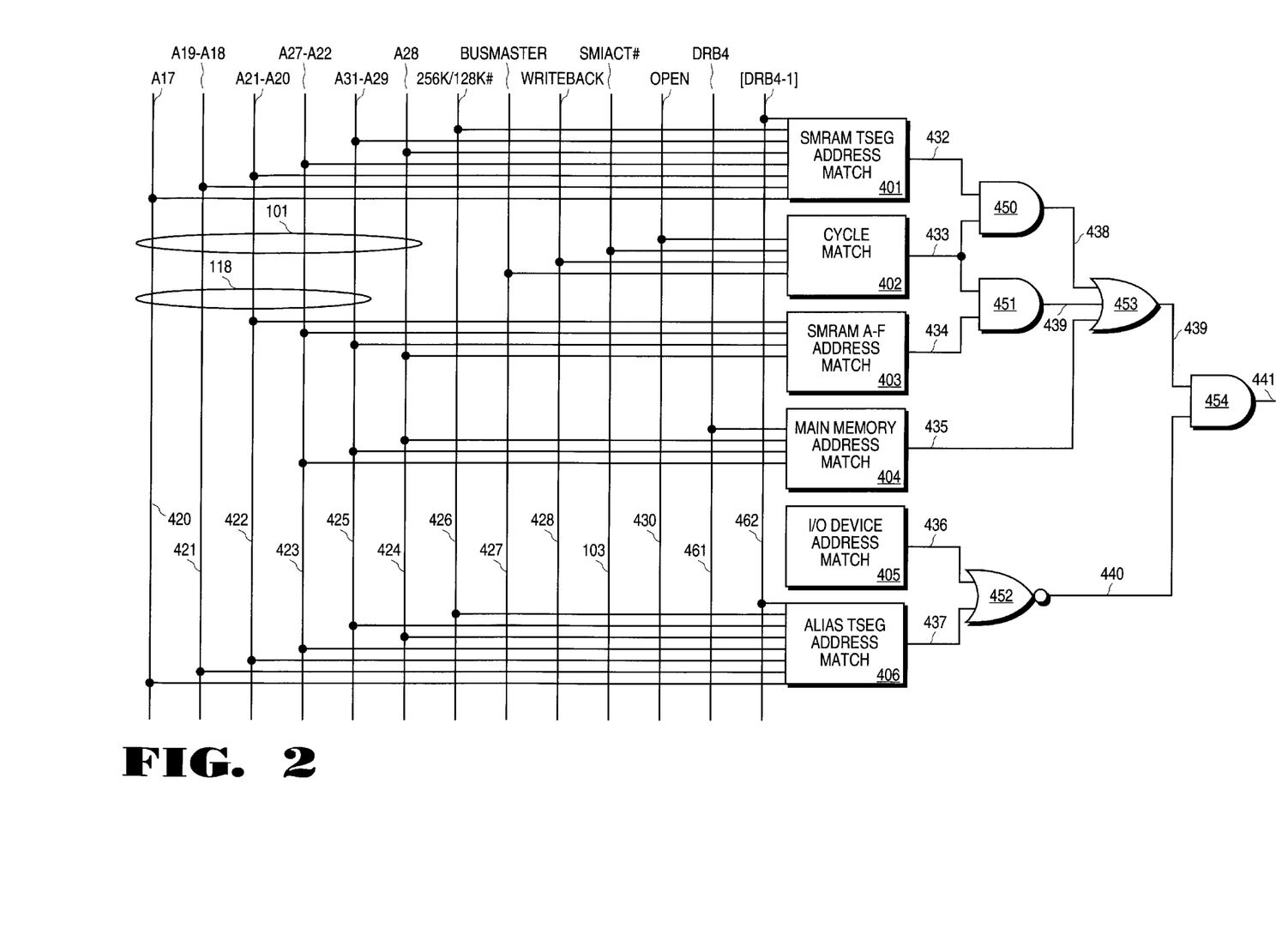
FIG. 2 illustrates one embodiment of the apparatus for protecting SMRAM access.

FIG. 2 illustrates one embodiment of the apparatus for detecting appropriate bus cycles on the system bus 130 and issuing a signal on a main memory issue bus 441 which indicates that the cycle is issued on the main memory bus 170.

An open bus 430, the SMIACT# bus 103 (The "#" suffix indicates that the signal is low when the condition is true), a writeback bus 428, and a busmaster bus 427 are coupled to a cycle match logic 402 which indicates on a cycle type match bus 433 whether a cycle type issued on the system bus 130 is permitted to access SMRAM. The open bus 430 indicates whether access to the SMRAM is permitted outside of SMM. It is used for SMRAM initialization, for example. The writeback bus 428 indicates whether the cycle issued on the system bus 130 is a writeback cycle. The open signal may be determined, for example, from the cycle status bus 102 according to well-known methods. The busmaster bus 427 indicates whether the cycle issued on the system bus 130 is generated by a non-CPU busmaster, such as a Peripheral Component Interconnect (PCI) device. The busmaster signal may be determined, for example, from the cycle status bus 102 according to well-known methods. The address bus 101 includes an address bit 17 (A17) bus 420, an address bit 19 and address bit 18 (A19–A18) bus 421, an address bit 21 and address bit 20 (A21–A20) bus 422, an address bit 27 through address bit 22 (A27–A22) bus 423, an address bit 28 (A28) bus 424, and an address bit 31 through address bit 29 (A31–A29) bus 425.

A [DRB4-1] bus 462 indicates the high order address bits corresponding to the last (highest) 4 megabytes of installed main memory according to well known methods. A 256K/128K# bus 426 indicates whether the SMRAM TSEG address range includes 256K addresses or 128K addresses. The address bus 101, the [DRB4-1] bus 462, and the 256K/128K# bus 426 are coupled to a SMRAM Top Segment (TSEG) Address match logic 401 which indicates on an SMRAM TSEG address match bus 432 whether the address is within the SMRAM TSEG address range. The SMRAM TSEG address match bus 432 and the cycle type match bus 433 are coupled to an AND gate 450 which indicates on an issue TSEG cycle bus 438 whether to permit a TSEG cycle.

The A28 bus 424 and the A31–A29 bus 425 are coupled to a SMRAM A–F Address match logic 403 which indicates on an SMRAM A–F address match bus 434 whether the address is within the SMRAM A–F address range. The SMRAM A–F address match bus 434 and the cycle type match bus 433 are coupled to an AND gate 451 which indicates on an issue A–F cycle bus 439 whether to permit an A–F cycle.

A DRB4 bus 461 indicates the high order address bits corresponding to the first (lowest) 4 MG of uninstalled memory address space according to well known methods. The A27–A22 bus 423, the A28 bus 424, the A31–A29 bus 425, and the DRB4 bus 461 are coupled to a main memory address match logic 404 which indicates on an issue main memory cycle bus 435 whether to permit a main memory (non-SMRAM) access according to well known methods. In one embodiment, the main memory match logic permits a main memory access for all addresses less than the address indicated by the DRB4 bus 461. One skilled in the art will recognize that other embodiments of the main memory match logic may be implemented.

An address hole# bus 440 indicates that the address is outside of the portions of the memory space that have been assigned to peripheral I/O devices or the alias SMRAM TSEG address range, for example. An I/O device address match logic 405 indicates on an I/O address match bus 436 that the address is within an I/O address range according to well known methods. An alias SMRAM TSEG address match logic 406 indicates on an alias SMRAM TSEG address match bus 437 that an address is within the alias SMRAM TSEC address range. The I/O address match bus 436 and the alias SMRAM TSEG address match bus 437 are coupled to the inputs of a NOR gate 452 which indicates on the address hole# bus 440 that the address is outside of the portions of the memory space that have been assigned to peripheral I/O devices or the alias SMRAM TSEG address range.

The issue TSEG cycle bus 438, the issue A–F cycle bus 439, and the issue main memory cycle bus 435 are coupled to an OR gate 453 which indicates on a conditional issue bus 442 that a cycle should issue if the signal on the address hole# bus 440 is not asserted. The conditional issue bus 442 and the address hole# bus 440 are coupled to the inputs of an AND gate 454 which indicates on the main memory issue bus 441 that the cycle is issued to main memory. In one embodiment, this signal is used to generate the cycle status signal that generates the issue signal of the cycle status bus 112 according to well known methods. In other embodiments, the issue signal is independently generated and this signal indicates whether the issued bus cycle should be directed to the main memory or an I/O device, for example.

Cycle Match Logic

Figure 3:
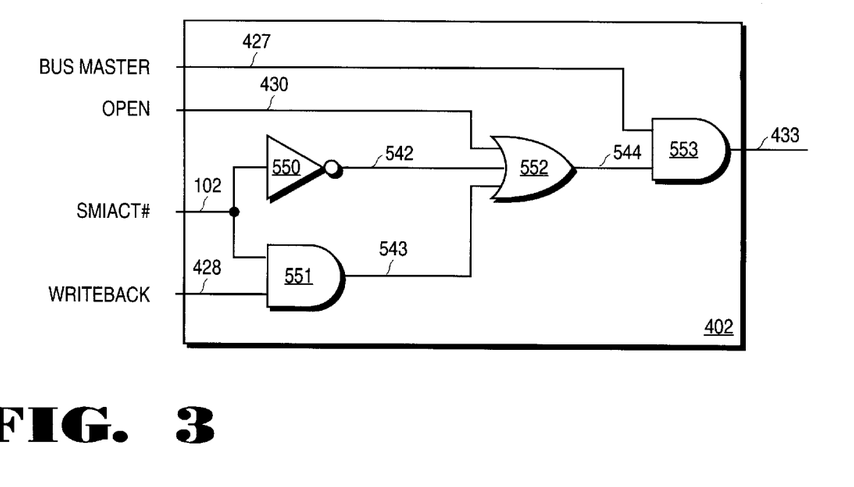
FIG. 3 illustrates one embodiment of SMRAM cycle match logic.

FIG. 3 illustrates one embodiment of the cycle match logic 402. The SMIACT# bus 103 is coupled to an inverter 550 which indicates on an SMIACT bus 542 whether SMM is active. The SMIACT# bus 103 and the writeback bus 428 are coupled to an AND gate 551 which indicates on a non-SMM writeback bus 543 whether the cycle is a writeback cycle while not in SMM. The open bus 430, the SMIACT bus 542, and the non-SMM writeback bus 543 are coupled to the inputs of an OR gate 552 which indicates on a conditional cycle type match bus 544 whether the cycle type is permitted to access SMRAM conditional on the signal on the busmaster bus 427. The conditional cycle type match bus 544 and the busmaster bus 427 are coupled to the inputs of an AND gate 553 which indicates on the cycle type match bus 433 whether the cycle type is permitted to access SMRAM.

In the embodiment of the cycle match logic 402 illustrated in FIG. 3, a cycle to SMRAM is only issued for writebacks when not in SMM (unless the open bit is set). This effectively protects the SMRAM from non-SMM accesses while still allowing SMM data that was written into the cache during SMM but not restored to main memory during SMM, to be so restored while not in SMM. In another embodiment, the writeback bus 428 is also asserted for other cycles which are permitted during SMM. In still another embodiment, all non-SMM bus cycles to SMRAM are ignored. Such protection must be supported by appropriately programmed SMM code. Such SMM code must force variables that are written before being read in SMM out of the cache and into main memory. One way SMM code can do this is to access enough cache-time aliases for the variable to be access so that the variable is evicted from the cache. Cache time aliases are addresses that correspond to the same set as the target data. When all the data locations corresponding to that set are filled, the cache will writeback data according to well-known methods to make room for more recently accessed data. In still another embodiment, non-SMM bus cycles are ignored or permitted depending on a protection mode signal. The implementation of each of these protection modes would be apparent to one skilled in the art. One skilled in the art will recognize that other embodiments of the cycle match logic 402 may be implemented.

SMRAM TSEG Match Logic

Figure 4:
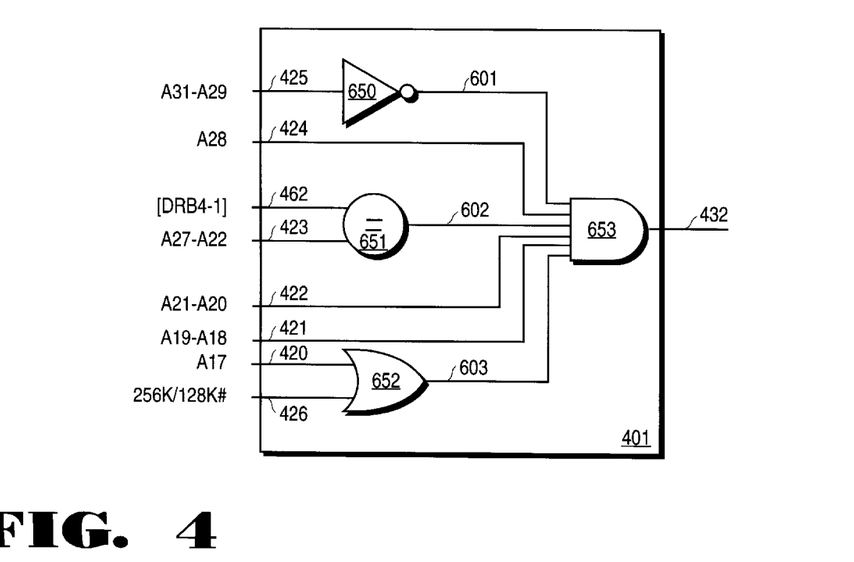
FIG. 4 illustrates one embodiment of SMRAM TSEC address match logic.

FIG. 4 illustrates one embodiment of the SMRAM TSEG address match logic 401. The A31–A29 bus 425 is coupled to the inputs of a set of inverters 650 which indicates on an A31–A29# bus 601 whether A31–A29 are high. The [DRB4-1] bus 462 and the A27–A22 bus 423 are coupled to the inputs of a comparator 651 which indicates on a last 4 MG bus 602 whether these address bits correspond to that of the last 4 MG of installed main memory. The A17 bus 420 and the 256K/128K# bus 426 are coupled to an OR gate 652 which indicates on an A17 match bus 603 whether the A17 bus corresponds to the Address bit 17 value required to be in the SMRAM TSEG address range. If the signal on the 256K/128K# bus 426 is low, the signal on the A17 bus 420 must be high for a match since the SMRAM TSEG address range includes only 128K addresses. If the signal on the 256K/128K# bus 426 is high, the SMRAM TSEG address range includes 256K addresses which correspond to both A17 high and A17 low. The A31–A290 bus 601, the A28 bus, the last 4 MG bus 602, the A21–A20 bus 422, the A19–A18 bus 421, and the A17 match bus 603 are coupled to an AND gate 653 which indicates on the SMRAM TSEG address match bus 432 whether the address is within the SMRAM TSEG address range.

SMRAM A–F Match Logic

Figure 5:
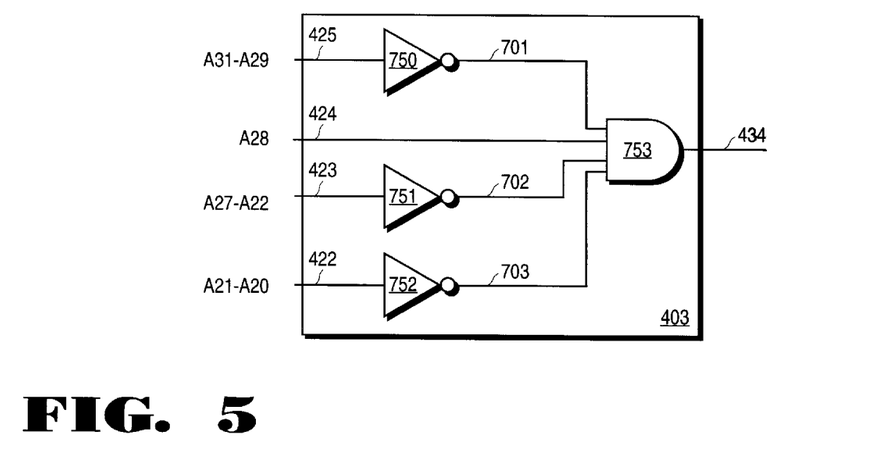
FIG. 5 illustrates one embodiment of SMRAM A–F SEG address match logic.

FIG. 5 illustrates one embodiment of the SMRAM A–F address match logic 403. The A31–A29 bus 425 is coupled to the inputs of a set of inverters 750 which indicate on an A31–A29# bus 701 whether the A31–A29 bits are high. The A27–A22 bus 423 are coupled to the inputs of a set of inverters 751 which indicate on an A27–A22# bus 702 whether the A27–A22 bits are high. The A21–A20 bus 422 are coupled to the inputs of a set of inverters 752 which indicates on an A21–A20# bus 703 whether the A21–A20 bits are high. The A31–A29# bus 701, the A28 bus 424, the A27–A22# bus 702 and the A21–A20# bus 703 are coupled to the inputs of an AND gate 753 which indicates on the SMRAM A–F address match bus 434 whether the address is within the SMRAM address range.

Alias SMRAM TSEG Address Match Logic

Figure 6:
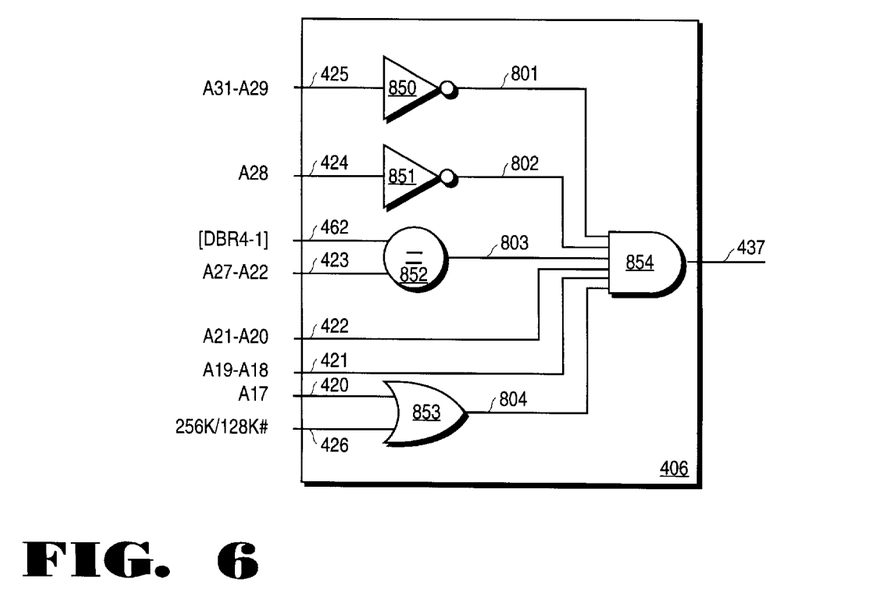
FIG. 6 illustrates one embodiment of alias SMRAM TSEG address match logic.

FIG. 6 illustrates one embodiment of the alias SMRAM TSEG address match logic 406. The A31–A29 bus 425 is coupled to the inputs of a set of inverters 850 which indicates on an A31–A29# bus 801 whether A31–A29 are high. The A28 bus 424 is coupled to the input of an inverter 851 which indicates on an A28# bus 802 whether A28 is high. The [DRB4-1] bus 462 and the A27–A22 bus 423 are coupled to the inputs of a comparator 852 which indicates on a last 4 MG bus 803 whether these address bits correspond to that of the last 4 MG of installed main memory. The A17 bus 420 and the 256K/128K# bus 426 are coupled to an OR gate 853 which indicates on an A17 match bus 804 whether the A17 bus corresponds to the Address bit 17 value required to be in the SMRAM TSEG address range. If the signal on the 256K/128K#/128K# bus 426 is low, the signal on the A17 bus 420 must be high for a match since the SMRAM TSEG address range includes only 128K addresses. If the signal on the 256K/128K# bus 426 is high, the SMRAM TSEG address range includes 256K addresses which correspond to both A17 high and A17 low. The A31–A29# bus 801, the A28# bus 802, the last 4 MG bus 803, the A21–A20 bus 422, the A19–A18 bus 421, and the A17 match bus 804 are coupled to an AND gate 854 which indicates on the alias SMRAM TSEG address match bus 437 whether the address is within the alias SMRAM TSEG address range.

Address Translation Logic

Figure 7:
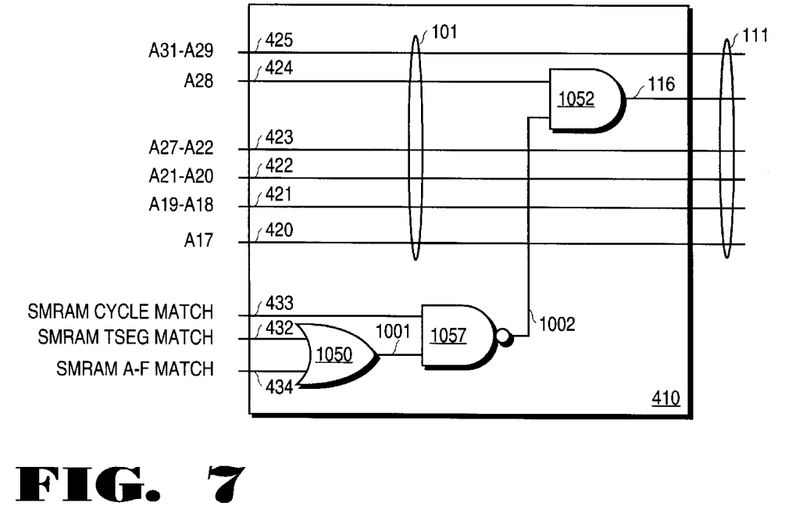
FIG. 7 illustrates one embodiment of address translation logic.

FIG. 7 illustrates one embodiment of the address translation logic 410 for converting the system bus address on the address bus 101 to the main memory bus address on the address bus 111. When the system bus address is within an SMRAM address range, the address is converted to its corresponding alias SMRAM address. When the system bus address is outside of the system bus address, the main memory address is the system bus address. The SMRAM TSEG address match bus 432 and the SMRAM A–F address match bus 434 are coupled to the inputs of an OR gate 1050 which indicates on an SMRAM address match bus 1001 whether the address on the address bus 101 is within an SMRAM address range. The SMRAM address match bus 1001 and the cycle type match bus 433 are coupled to the inputs of an NAND gate 1057 which indicates on an SMRAM cycle# bus 1002 whether the cycle is an SMRAM cycle that is permitted. The A28 bus 424 and the SMRAM cycle# bus 1002 are coupled to the inputs of an AND gate 1052 which indicates on an A28 out bus 116 the value of the A28 bit on the main memory bus. The other address bits, including the A31–A29 bus 425, the A27–A22 bus 423, the A21–A20 bus 422, the A19–A18 bus 421, and the A17 bus 420 are common to both the address bus 101 and the address bus 111.

Hard Error Logic

Figure 8:
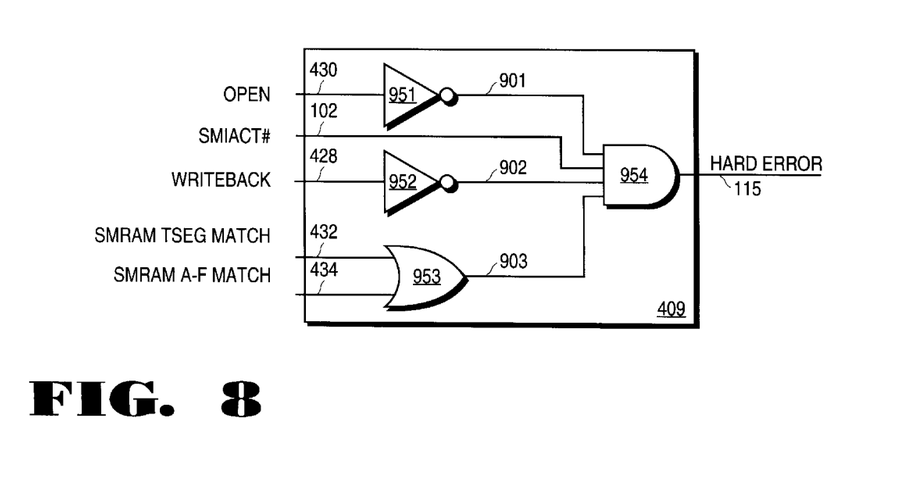
FIG. 8 illustrates one embodiment of hard error generation logic.

FIG. 8 illustrates one embodiment of an optional hard error logic 409. The open bus 430 is coupled to the input of an inverter 951 which indicates on an open# bus 901 whether the SMRAM space is unconditionally available. The writeback bus 428 is coupled to an inverter 952 which indicates on the writeback# bus whether the cycle is a writeback. The SMRAM TSEG address match bus 432 and the SMRAM A–F address match bus 434 is coupled to the inputs of an OR gate 953 which indicates on an SMRAM address bus 903 whether the address is within an SMRAM address range. The open# bus 901, the SMIACT# bus 103, a writeback# bus 902, and the SMRAM address bus 903 are coupled to the input of an AND gate 954 which indicates on a hard error bus 115 whether a hard error has occurred. In one embodiment, the hard error signal indicates that a bus cycle to an SMRAM address range other than a writeback cycle was initiated in non-SMM. In one embodiment, non-writeback cycles include well-known cycle types, such as read cycles, read-for-ownership cycles, and a cache-fill cycles, and non-writeback write cycles. It will be apparent to one skilled in the art that an error signal may be generated for sets of bus cycles that include other cycle types or do not include some of the aforementioned cycle types. In one embodiment, the hard error signal is used to set a bit in a register. In another embodiment, the hard error signal is used to generate an interrupt signal that may be used to initiate an error handling routine.

Address Translation and SMRAM Protection Method

Figure 9:
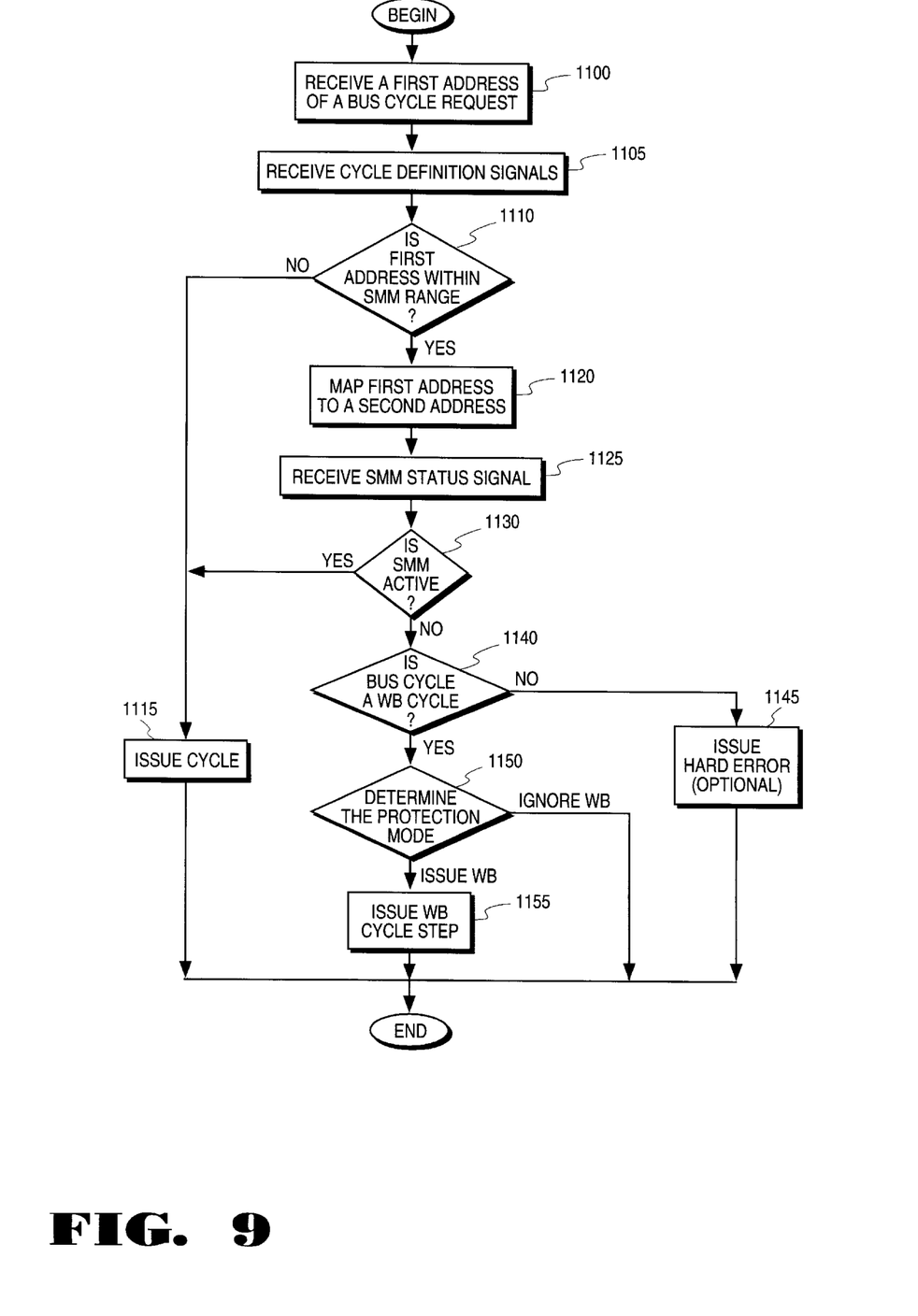
FIG. 9 illustrates one embodiment of a method for mapping the SMRAM to main memory while providing protection of aliased SMRAM space when not in SMM.

FIG. 9 describes some embodiments of the method of the invention to translate an SMRAM address to an alias SMRAM address and protect the SMRAM from certain accesses while not in SMM. The following steps also refer to FIG. 1. In step 1100, the address match logic (the SMRAM TSEG address match logic 401 or the SMRAM A–F address match logic 403, for example) receives the first address from the system bus 130. In step 1105, the cycle match logic 402 receives the cycle status signals from the system bus 130. In step 1110, the address match logic determines whether the first address is within the SMRAM range. If the first address is not within the SMRAM range, the cycle is issued on the main memory bus 170 in step 1115 and the method ends. If the first address is within the SMRAM range, the address translation logic 410 translates (maps) the first address to a corresponding second address within the alias SMRAM range in step 1120. The cycle match logic 402 receives the SMM status signal in step 1125. In step 1130, the cycle match logic 402 determines whether SMM is active. If SMM is active, the cycle is issued on the main memory bus 170 in step 1115 and the method ends. If SMM is not active, the cycle match logic 402 determines whether the cycle is a writeback cycle in step 1140. If the cycle is not a writeback cycle, the optional hard error logic 409 issues a hard error in step 1145 and the method ends. If the cycle is a writeback cycle, there are different responses depending on the embodiment. In one embodiment, the cycle match logic 402 issues the cycle on the main memory bus 170 in step 1155. In another embodiment, the cycle match logic 402 ignores the cycle. In still another embodiment, the cycle match logic 402 determines which protection mode is enabled in step 1150. If writebacks are allowed in that protection mode, the cycle match logic 402 issues the cycle on the main memory bus 170 in step 1155. If writebacks are not permitted in that protection mode, the cycle match logic 402 ignores the cycle.

Other Embodiments

Other embodiments of the present invention may be implemented. For example, the computer system may include multiple processor subsystems or other devices that drive data onto a system bus. In addition, although reference to Intel architecture microprocessors, such as the Pentium® processor is made, other microprocessor architectures, such as the PowerPC™ and the Alpha™ processor may also be used in accordance with the described invention. (Pentium® is a registered trademark of Intel Corporation. PowerPC™ is a trademark of IBM, APPLE COMPUTER, and MOTOROLA. Alpha™ is a trademark of Digital Equipment Corporation.)

What is claimed is:

1. A circuit for processing a bus cycle having a first address comprising:

an address match logic for determining whether said first address is within a system management random access memory (SMRAM) address range, said SMRAM address range being outside of a main memory address range; and an address translation logic to translate said first address to a second address within said main memory wherein said second address is an unused address within said main memory said translation providing concurrent caching of data stored at said first address and data included in said main memory.

2. The circuit of claim 1 wherein said SMRAM address range is from Z00000H to ZFFFFFH, inclusive, wherein Z represents a permutation of at least one bit.

3. The circuit of claim 1 wherein said SMRAM address range is from ZA0000H to ZDFFFFH, inclusive, wherein Z represents a permutation of at least one bit.

4. The circuit of claim 1 further comprising a range selection bus wherein said SMRAM address range is at least partially determined by a value on said range selection bus.

5. The circuit of claim 1 wherein all addresses within said SMRAM address range has an A20 bit which is zero.

6. The circuit of claim 1 wherein said corresponding second address is within a graphics adapter memory address range.

7. The circuit of claim 1 wherein said corresponding second address is within an industry standard architecture (ISA) region address range.

8. The circuit of claim 1 wherein said corresponding second address is within a reserved portion of said main memory address range.

9. The circuit of claim 1 further comprising a protection logic for selectively processing said bus cycle, said protection logic comprising:
   a cycle match logic for determining whether said bus cycle is one of a first set of bus cycle types when in not in SMM; and
   a first output coupled to said cycle match logic indicating that said bus cycle is to be performed when said first address within said SMRAM address range and said bus cycle is one of said first set of bus cycle types while not in SMM and indicating that SMRAM bus cycle is not to be performed when said first address is within said SMRAM address range and bus cycle is not one of said first set of bus cycle types while not in SMM.

10. The circuit of claim 9 wherein said SMRAM address range is from Z00000H to ZFFFFFH, inclusive, wherein Z represents a permutation of at least one bit, wherein at least a portion of said at least one bit are determined by said value.

11. The circuit of claim 4 wherein said SMRAM address range is from ZA0000H to ZDFFFFH, inclusive, wherein Z represents a permutation of at least one bit, wherein at least a portion of said at least one bit are determined by said value.

12. The circuit of claim 8 wherein said reserved portion comprises the highest (last) portion of said main memory address range.

13. The circuit of claim 9 wherein said first set of bus cycle types comprises a writeback cycle.

14. The circuit of claim 9 further comprising an error logic for processing said bus cycle, said error logic comprising:
   a hard error logic for determining whether said bus cycle is one of a second set of bus cycle types while not in SMM; and
   a second output coupled to said hard error logic indicating that said bus cycle was requested when when said first address is within said SMRAM address range and said bus cycle is one of said second set of bus cycle types while not in SMM.

15. The circuit of claim 14 wherein said second set of bus cycle types comprises a read cycle.

16. The circuit of claim 14 wherein said second set of bus cycle types comprises a read-for-ownership cycle.

17. The circuit of claim 14 wherein said second set of bus cycle types comprises a cache-fill cycle.

18. The circuit of claim 14 wherein said second set of bus cycle types comprises a write cycle, wherein said write cycle is not a writeback cycle.

19. A computer system with SMRAM which issues a bus cycle, said computer system comprising:
   a processor comprising a SMM status bus indicating whether said processor is in SMM;
   a cache memory coupled to said processor;
   a cycle type bus coupled to said cache memory for indicating a cycle type;
   a first address bus coupled to said cache memory indicating a first address of the bus cycle;
   an address translation logic coupled to said first address bus to translate said first address to a second address within said main memory, wherein said second address is an unused address within said main memory, said translation providing concurrent caching of data stored at said first address and data included outside said SMRAM address range;
   a second address bus coupled to said address translation logic indicating the second address of the bus cycle; and
   a main memory coupled to said second address bus, said second address being within said main memory address range.

20. The computer system of claim 19 wherein said cache memory comprises a data element stored during SMM and a data element stored during non-SMM.

21. The computer system of claim 19 wherein said SMRAM address range is from Z000000H to ZFFFFFFH, inclusive, wherein Z represents a permutation of at least one bit.

22. The computer system of claim 19 wherein said SMRAM address range is from ZA0000H to ZDFFFFH, inclusive, wherein Z represents a permutation of at least one bit.

23. The computer system of claim 19, wherein said address translation logic further comprises a range selection bus wherein said SMRAM address range is at least partially determined by a value on a range selection bus.

24. The computer system of claim 19 further comprising a Plug and Play BIOS, said SMRAM address range being reserved by a 32-bit Fixed Location Memory Range Descriptor.

25. The computer system of claim 19 wherein all addresses within said SMRAM address range have an A20 bit which equals zero.

26. The computer system of claim 19 wherein said corresponding second address is within a graphics adapter memory address range.

27. The computer system of claim 19 wherein said corresponding second address is within an industry standard architecture (ISA) region address range.

28. The Computer system of claim 19 wherein said corresponding second address is within a reserved portion of said main memory address range.

29. The computer system of claim 19 further comprising protection logic for processing a first group of said SMRAM bus cycle types while SMM is inactive, said protection logic comprising:
   a cycle match logic for determining whether said bus cycle is one of a first set of bus cycle types when in not in SMM; and
   a cycle enable output coupled to said cycle match logic indicating that said bus cycle is to be performed when said first address within said SMRAM address range and said bus cycle is one of said first set of bus cycle types while not in SMM and indicating that SMRAM bus cycle is not to be performed when said first address is within said SMRAM address range and bus cycle is not one of said first group of said SMRAM bus cycle types while not in SMM.

30. The computer system of claim 24 wherein said cache memory further comprises a tag address corresponding to said data element stored during SMM, said tag address corresponding to an address that is outside the main memory address range.

31. The computer system of claim 23 wherein said SMRAM address range is from Z000000H to ZFFFFFFH, inclusive, wherein Z represents a permutation of at least one bit, wherein at least a portion of said at least one bit are determined by said value.

32. The computer system of claim 23 wherein said SMRAM address range is from ZA0000H to ZDFFFFH, inclusive, wherein Z represents a permutation of at least one bit, wherein at least a portion of said at least one bit are determined by said value.

33. The computer system of claim 23 further comprising a BIOS, wherein said BIOS provides said value.

34. The computer system of claim 23 said value is used to determine the most significant bit of said SMRAM address range.

35. The computer system of claim 28 wherein said reserved portion comprises the highest (last) portion of said main memory address range.

36. The computer system of claim 29 wherein said first set of bus cycle types comprises a writeback cycle.

37. The computer system of claim 29 further comprising error logic for processing a second set of bus cycle types while SMM is inactive, said error logic comprising:
   a hard error logic coupled to said SMM status bus and said cycle type bus for determining whether said bus cycle is one of said second set of bus cycle types; and
   a hard error output coupled to said hard error logic indicating that said bus cycle was requested when when said first address is within said SMRAM address range and said bus cycle type is one of said second set of bus cycle types.

38. The computer system of claim 37 wherein said second set of bus cycle types comprises a read cycle.

39. The computer system of claim 37 wherein said second set of bus cycle types comprises a read-for-ownership cycle.

40. The computer system of claim 37 wherein said second set of bus cycle types comprises a cache-fill cycle.

41. The computer system of claim 37 wherein said second set of bus cycle types comprises a write cycle, said write cycle not being a writeback cycle.

42. A method for processing a bus cycle to protect system management memory for performing bus cycles, said method comprising:
   receiving a first address of the bus cycle;
   determining whether said first address is within an SMRAM address range; and
   generating a second address corresponding to said first address, said second address to translate said first address to an unused address within said main memory, said translation providing concurrent caching of data stored at said first address and data included in said main memory.

43. The method of claim 42 further comprising the steps of:
   receiving at least one range selection bit; and
   determining at least a portion of said SMRAM address range using said at least one range selection bit.

44. The method of claim 42 further comprising the steps of:
   receiving SMM status;
   receiving a bus cycle type;
   determining whether said bus cycle type is one of a first set of bus cycle types while not in SMM; and
   indicating that the bus cycle should be performed if said first address is within said SMRAM address range and said bus cycle type is one of said first set of bus cycle types while not in SMM.

45. The method of claim 44 wherein said first group of said SMRAM bus cycle types comprises a writeback cycle.

46. The method of claim 44 further comprising the steps of:
   receiving SMM status;
   receiving a bus cycle type;
   determining whether said bus cycle type is one of a second set of said bus cycle types while not in SMM; and
   indicating an error if said first address is within said SMRAM address range and said bus cycle is one of said second set of bus cycle types while not in SMM.

47. The method of claim 46 wherein said second set of bus cycle types comprises a read cycle.

48. The method of claim 46 wherein said second set of bus cycle types comprises a read-for-ownership cycle.

49. The method of claim 46 wherein said second set of bus cycle types comprises a cache-fill cycle.

50. The method of claim 46 wherein said second set of bus cycle types comprises a write cycle.

51. A cycle processing means for processing a bus cycle having a first address comprising:
   an address matching means for determining whether said first address is within a system management random access memory (SMRAM) address range, said SMRAM address range being outside of a main memory address range; and
   a translation means for translating said first address to a second address within said main memory, wherein said second address is an unused address within said main memory, said translation providing concurrent caching of data stored at said first address and data included in said main memory address range.

52. The cycle processing means of claim 51 wherein said SMRAM address range is from Z00000H to ZFFFFH, inclusive, wherein Z represents a permutation of at least one bit.

53. The cycle processing means of claim 51 wherein said SMRAM address range is from ZA0000H to ZDFFFFH, inclusive, wherein Z represents a permutation of at least one bit.

54. The cycle processing means of claim 51 further comprising a range input means wherein said SMRAM address range is at least partially determined by said range selection means.

55. The cycle processing means of claim 51 wherein all addresses within said SMRAM address range has an A20 bit which is zero.

56. The cycle processing means of claim 51 wherein said main memory address range is within 00000000H to at most 0FFFFFFFH, inclusive.

57. The cycle processing means of claim 51 further comprising a protection logic for selectively processing said bus cycle, said protection logic comprising:
   a cycle match means for determining whether said bus cycle type is one of a first set of bus cycle types; and
   a cycle enable output means coupled to said cycle match means indicating that said bus cycle is to be performed when said first address within said SMRAM address range and said bus cycle type is one of said first set of bus cycle types while not in SMM and indicating that SMRAM bus cycle is not to be performed when said first address is within said SMRAM address range and bus cycle is not one of said first set of bus cycle types while not in SMM.

58. The cycle processing means of claim 54 wherein said SMRAM address range is from Z00000H to ZFFFFFH, inclusive, wherein Z represents a permutation of on or more bit, wherein at least a portion of said at least one bit are determined by said range selection means.

59. The cycle processing means of claim 54 wherein said SMRAM address range is from ZA0000H to ZDFFFFH, inclusive, wherein Z represents a permutation of at least one bit, wherein at least a portion of said at least one bit are determined by said range selection means.

60. The cycle processing means of claim 57 wherein said first set of bus cycle types comprises a writeback cycle to SMRAM.

61. The cycle processing means of claim 57 further comprising error logic for processing said bus cycle, said error logic comprising:

an error detection means for determining whether said bus cycle is one of a second set of bus cycle types; and an error output means coupled to said error detection means indicating that said bus cycle was requested when when said first address is within said SMRAM address range and said bus cycle is one of said second set of bus cycle types.

62. The cycle processing means of claim 61 wherein said second set of bus cycle types comprises a read cycle.

63. The cycle processing means of claim 61 wherein said second set of bus cycle types comprises a read-for-ownership cycle.

64. The cycle processing means of claim 61 wherein said second set of bus cycle types comprises a cache-fill cycle.

65. The cycle processing means of claim 61 wherein said second set of bus cycle types comprises a write cycle, wherein said write cycle is not a writeback cycle.

* * * * *